United States Patent Office 3,247,188
Patented Apr. 19, 1966

3,247,188
18,20-OXIDO-PREGNANES AND DERIVATIVES THEREOF
Oskar Jeger, Zurich, Duilio Arigoni, Zollikerberg, Georg Anner and Charles Meystre, Basel, and Albert Wettstein, Riehen, Switzerland, assignors to Ciba Corporation, a corporation of Delaware
No Drawing. Filed Feb. 9, 1960, Ser. No. 7,525
Claims priority, application Switzerland, Feb. 12, 1959, 69,475/59; Apr. 23, 1959, 72,443/59; July 3, 1959, 75,260/59
11 Claims. (Cl. 260—239.55)

This invention relates to a process for the manufacture of 18-oxygenated steroids from 18-unsubstituted steroids.

The 18-oxygenated steroids, especially 18-oxygenated pregnane compounds, are of considerable interest owing to their physiological action. This class of compounds includes aldosterone which on account of its specific action on electrolyte metabolism is of great importance. The compound occurs in adrenal glands in but extremely slight quantity. So far, substantial quantities could be obtained only from simple chemical substances by total synthesis involving many stages. The present process now provides a possibility of obtaining 18-oxygenated steroids, especially 18-oxygenated pregnanes, that is to say, also aldosterone and its derivatives and related compounds in a simple manner through direct selective substitution of the angular non-activated methyl group attached to carbon atom 13 in the intact steroid structure. Accordingly, 18-oxygenated steroids can be produced in any quantity from easily obtainable steroids of vegetable or animal origin.

The new process comprises three major steps, namely,
(1) The formation of an 18,20-ether, starting from an 18-unsubstituted 20-hydroxy pregnane,
(2) The splitting or oxidative conversion of the 18:20-ether into 18-hydroxy or 18-acid derivatives,
(3) The further oxidation of the resulting polyoxygenated 18-hydroxy compounds.

The scheme of partial formulae below illustrates the process in the case of an 11-oxygenated compound.

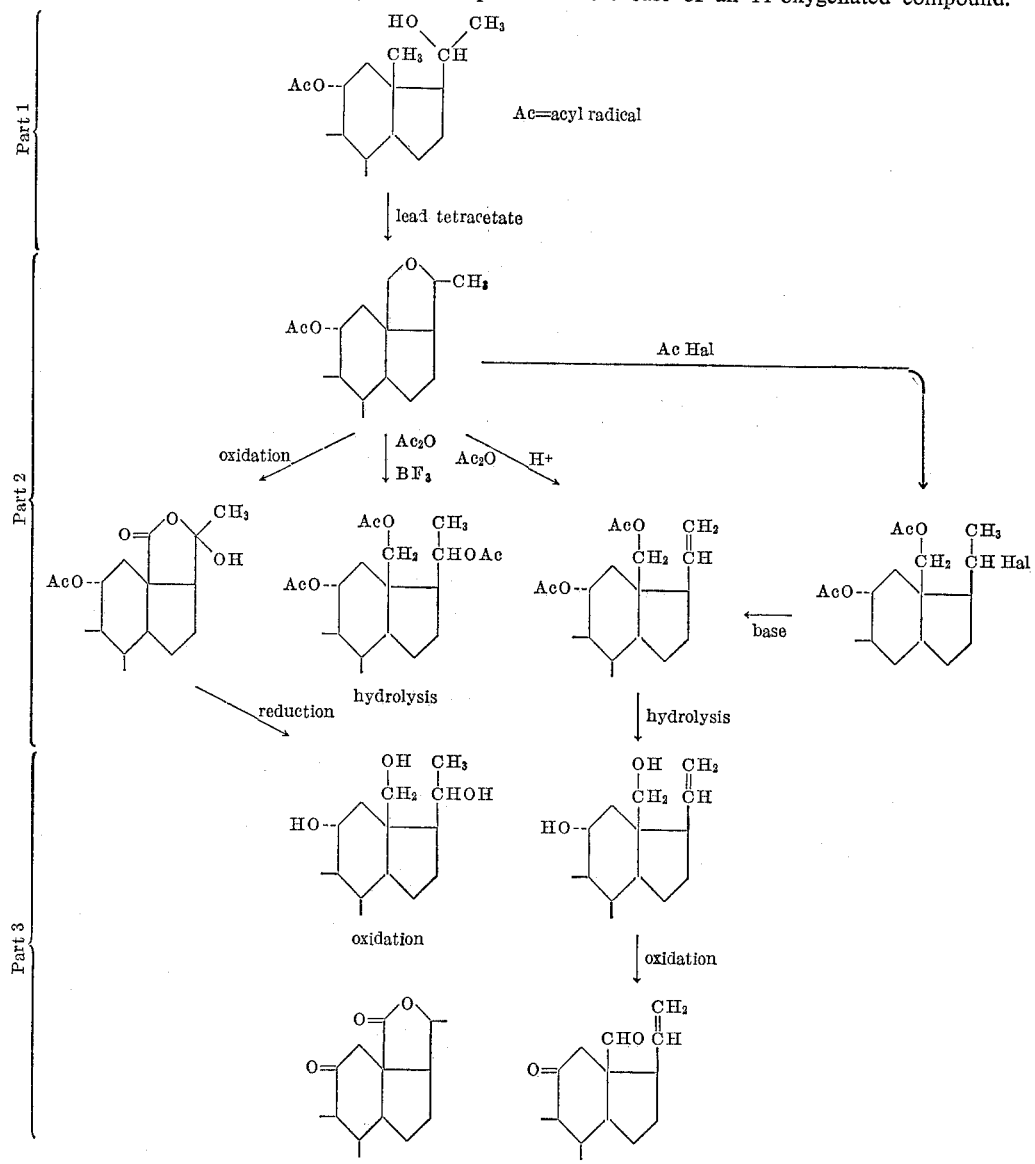

This application relates to the first part of the above-described process, namely, the manufacture of 18:20-oxido-steroids. It consists in reacting 18-unsubstituted 20-hydroxy-steroids with acyloxy radicals having an oxidizing action. Conversion of the 18:20-oxygenated compounds shown in part 3 of the reaction scheme given above to aldosterone and derivatives thereof is shown in copending application Serial No. 7,543, filed on even date herewith.

Suitable for the conversion according to this process of 20-hydroxy-steroids into the 18:20-oxido-steroids are acyloxy radicals having an oxidizing action, such as are obtained especially by the splitting of metal acylates. Of the latter, the following deserve special mention: lead tetracylate, e.g. lead tetracetate, lead tetrapropionate, lead tetrabutyrate, lead tetrabenzoate, lead tetratrifluoracetate. The above reactions can be catalyzed by the addition of peroxides, e.g. benzoyl peroxide, or of salts of divalent iron, such as ferroammonium sulfate hexahydrate. The reaction with lead tetracetate can be performed in the presence of an equimolecular quantity of boron trifluoride. The reaction is performed in a suitable solvent which is inert towards the oxidizing agent, such as hydrocarbons, e.g., benzene. Particularly suitable are saturated hydrocarbons, such as cyclohexane, primarily methylcyclohexane, also dimethylcyclohexane and the like, advantageously in the presence of a weak base, e.g., calcium carbonate. The reaction is advantageously carried out at a temperature between 50 and 150° C., although it can be performed below or above this range.

Suitable starting materials for the instant process are primarily 20-hydroxy compounds for the 5α- and 5β-pregnane series, which may have further substituents in the ring system, especially in one or more of the positions 1, 2, 3, 4, 5, 6, 7, 8, 9, 10, 11, 12, 14, 15, 16, 17, 21, such as esterified or etherified hydroxyl groups, free or functionally converted, e.g. ketalized, oxo groups, alkyl groups, such as methyl groups, or halogen atoms. Apart from this, the starting materials may have double bonds, e.g. emanating from carbon atom 5 and/or in 9,11-position. Specific starting materials are, for example, derivatives of the following compounds: 3β:20-dihydroxy-5α - pregnane, 3β:20 - dihydroxy - 11-oxo-5α-pregnane, 3β:20 - dihydroxy - 11β-acyloxy-5α-pregnane, 3β:11α:20-trihydroxy - 5α-pregnane, 3α:20-dihydroxy-5β-pregnane, 3α:20 - dihydroxy-11-oxo-5β-pregnane, 3α:20 - dihydroxy-11β-acyloxy-5β-pregnane, 3α:11α:20-trihydroxy-5β-pregnane, Δ$^4$-3-oxo-11α:20-dihydroxy pregnene, and also the 20-methyl pregnanes obtained by reaction of the corresponding 20-oxopregnane compounds with a methyl metal compound. The starting materials mentioned are advantageously used in the form of their 3-mono- or 3:11-diesters or their 3-ketals. Suitable ester groups include aliphatic cycloaliphatic, aromatic, araliphatic and heterocyclic esters, e.g. acetates, propionates, butyrates, trifluoracetates, alkoxy carbonates, hexahydrobenzoates, cyclopentyl propionates, pivalates, benzoates, furoates.

In the reactions according to this invention, there are often formed as by-products under the action of the lead acylates the corresponding 20-acylates, with lead tetracetate e.g. 20-acetates. In such cases it is therefore of advantage to introduce into the starting material employed difficulty saponifiable ester groups, e.g. in 3- and/or 11-position, so that after the reaction according to this invention 20-ester group can be saponified to form the free hydroxyl group and the starting material so recovered can be used again. Difficultly saponifiable esters are for example, pivalates, benzoates, hexahydrobenzoates and the like.

This invention is also directed to 3-oxygenated 21-unsubstituted 18:20-oxido-pregnane compounds containing in 20-position a hydrogen atom or an alkyl radical. These new compounds may be obtained as the direct products of the reactions according to this invention and in this case contain the same substituents as the starting materials used. However, in these products the substituents such as functional groups can be further converted, e.g. esterified or etherified hydroxyl groups and/or ketalized oxo groups can be hydrolyzed. Free hydroxyl or oxo groups can be oxidized or reduced, or further double bonds can be introduced or existing double bonds can be hydrogenated or converted by the additive combination with hypohalous acid.

Of the new 18:20-oxido-steroids there may be mentioned in particular 3β-hydoxy-18:20-oxido-5α-pregnane, 3α:11β - dihydroxy - 18:20 - oxido - 5β-pregnane, 3β - hydroxy - 20 - methyl - 18:20 - oxido - 5α-pregnane, 3α:11α - dihydroxy - 18:20 - oxido - 5β - pregnane, Δ$^4$ - 3 - oxo - 11α - hydroxy - 18:20-oxido-pregnene, Δ$^4$ - 3:11 - dioxo - 18:20 - oxido - pregnene, 3-oxo-11α-hydroxy - 18:20 - oxido - 5β - pregane, 3:11 - dioxo-18:20 - oxido - 5β - pregnane, 3α - hydroxy - 11 - oxo-18:20 - oxido - 5β - pregnane, Δ$^5$ - 3β:21 - dihydroxy-18:20-oxido-pregnene, and the corresponding compounds with esterified hydroxyl groups, in particular acetate, propionates, pivalates, benzoates, hexahydrobenzoates, etc., and the ketals derived from the oxo compounds mentioned.

The products without oxygen function in 11-position obtained by the process of this invention can be converted into the 11-oxygenated products by means of micro- organisms, advantageously after further conversion of the 18:20 ether and introduction of the Δ$^4$-3-keto grouping.

The following examples illustrate the invention. The temperatures are shown in degrees centigrade.

Example 1

500 mg. of 3β-acetoxy-20β-hydroxy-5α-pregnane are dissolved in 30 cc. of absolute benzene, the solution treated with 840 mg. of lead-(IV)-acetate, and refluxed overnight. The yellowish suspension is poured into a potassium iodide solution, the mixture extracted with ether, and the organic phase washed with dilute sodium sulfate solution and much water. The residue obtained on distilling off the ether is purified by chromatography over neutral alumina of activity II. Apart from 250 mg. of unchanged starting material, there can be isolated 150 mg. of a compound which after being recrystallized from dilute methanol melts at 132°. $[\alpha]=-6°$ (in CHCl$_3$), IR spectrum (CHCl$_3$): no hydroxy band at 2.86μ; acetate band at 5.80μ. The preparation is free from methoxyl. It is 3β-acetoxy-18:20β-oxido-5α-pregnane.

Saponification of the 3-acetate with 5% methanolic potassium hydroxide solution leads to the crystalline 3β-hydroxy-18:20-oxido-5α-pregnane, which shows no carboxyl band in the 6μ area of the IR spectrum, but shows a band at 2.86μ (hydroxyl group).

Example 2

On treating 3α:11β-diacetoxy-20β-hydroxy-5β-pregnane with lead-(IV)-acetate in benzene solution as described in Example 1, the corresponding 3α,11β-diacetoxy-18:20β-oxido-5β-pregnane can be isolated.

The starting material for this oxidation is obtained from 3α-acetoxy-11:20-diketo-5β-pregnane by selective ketalization of the 20-keto group, reduction with lithium aluminum hydride to form the 11β-hydroxy derivative, acetylation of the latter with acetic anhydride and glacial acetic acid in the presence of p-toluenesulfonic acid, hydrolysis of the 20-ketal grouping and subsequent reduction of the liberated 20-keto group with platinum oxide catalyst in glacial acetic acid solution.

Example 3

1 g. of 3β-acetoxy-20β-hydroxy-5α-pregnane of melting point 161° is dissolved in 50 ml. of absolute benzene, and refluxed overnight with 2 g. of freshly dried lead-(IV)-acetate. The reaction mixture is then poured into an aqueous solution of potassium iodide, taken up in ether, and the organic phase washed with sodium sulfite solution and water. The crude product is purified by chromatography through a column of neutral alumina of activity II. The fractions eluted with petroleum ether and the first fractions eluted with a 9:1 mixture of petroleum ether and benzene yield two substances, A (20 mg.) and B (150 mg.) which, after being recrystallized from dilute methanol, melt at 113–115°, and 120–121°, respectively. Further elution of the column with a 9:1 mixture of petroleum ether and benzene yields 250 mg. of a compound which crystallizes from methanol in prisms having a constant melting point of 137–138°. For analysis a test portion is sublimed in a high vacuum at a block temperature of 130°. $[\alpha]_D = -6.3°$ (in chloroform). The product is the 3β-acetoxy-18:20β-oxido-5α-pregnane described in Example 1.

According to melting point and mixed melting point test, the ether eluates (200 mg.) are unchanged starting material.

For hydrolysis, 85 mg. of 3β-acetoxy-18:20β-oxido-5α-pregnane are saponified overnight at room temperature with 10 ml. of 2.5% methanolic potassium hydroxide solution. Working up leads to 80 mg. of crystals which after crystallization from methanol have a constant melting point of 137–138°. $[\alpha]_D = +3°$ (in chloroform). The product is 3β-hydroxy-18:20β-oxido-5α-pregnane.

*Example 4*

300 mg. of 3β-acetoxy-20-hydroxy-20-methyl-5α-pregnane, dissolved in 20 ml. of absolute benzene, are refluxed overnight with 600 mg. of freshly dried 98% lead-(IV)-acetate. The reaction mixture is then poured into an aqueous solution of potassium iodide, taken up in ether, and the organic phase thoroughly washed with sodium sulfite solution and water. The crude product, 292 mg., is dissolved in 50 ml. of a 1:1 mixture of petroleum ether and benzene, and the solution filtered through a column of 10 g. of alumina of activity II. With 250 ml. of the above solvent mixture a total of 172 mg. of substance can be eluted from the column, and with ether 111 mg. The non-polar eluates of this chromatogram are dissolved in 20 ml. of petroleum ether and the solution carefully chromatographed through a column of 8 g. of alumina of activity I. With a 9:1 petroleum ether/benzene mixture a total of 63 mg. of crystals can be eluted from the column. They are saturated towards tetranitromethane and melt between 140 and 145°. After recrystallization from dilute methanol they crystallize in the form of needles of melting point 152–153°. $[\alpha]_D = +18°$ (in chloroform); IR absorption spectrum (in chloroform): no hydroxyl bands; sharp acetate band at 5.78μ. The product is 3β-acetoxy-18:20-oxido-20-methyl-5α-pregnane.

*Example 5*

1 g. of 3α:11α-diacetoxy-20β-hydroxy-5β-pregnane, obtained on reducing 3α:11α-diacetoxy-20-keto-5β-pregnane with lithium borohydride in tetrahydrofuran, is dissolved in 50 ml. of absolute benzene, the solution is boiled with 2 g. of freshly dried lead-(IV)-acetate for 15 hours under reflux, and then worked up as described in the preceding examples. After chromatographic purification 420 mg. of 3α:11α-diacetoxy-18:20β-oxido-5β-pregnane are obtained which in the IR spectrum show no bands typical of hydroxyl groups.

*Example 6*

1 g. of 3β:11β-diacetoxy-20β-hydroxy-5α-pregnane, obtained by catalytic reduction of 3β:11β-diacetoxy-20-keto-5α-pregnane, is dissolved in 50 ml. of absolute benzene, the solution refluxed for 15 hours with 2 g. of freshly dried lead-(IV)-acetate, and then worked up in a manner analogous to that described in Example 3. On chromatography 290 mg. of 3β:11β-diacetoxy-18:20β-oxido-5α-pregnane are obtained.

*Example 7*

1 g. of Δ⁵-3-ethylenedioxy-11α-acetoxy-20β-hydroxy-pregnene, obtained by reduction of Δ⁵-3-ethylenedioxy-11α-acetoxy-20-keto-5β-pregnene with sodium borohydride at room temperature, is dissolved in 100 ml. of absolute benzene, and the solution treated with 2 g. of lead-(IV)-acetate. On chromatographic purification over alumina of activity II, 510 mg. of pure Δ⁵-3-ethylenedioxy-11α-acetoxy-18:20β-oxido-pregnene are obtained.

*Example 8*

1 g. of 3β-acetoxy-20-hydroxy-5α-pregnane, 2 g. of lead tetracetate, 1 g. of calcium carbonate, and 50 mg. of benzoyl peroxide are covered with 50 cc. of absolute benzene. The suspension is refluxed for 15 hours under calcium chloride seal, then cooled and filtered with suction. The filter residue is washed with benzene, the benzenic solution extracted with an aqueous sodium bisulfite solution and water, dried and evaporated in vacuo. The resulting residue is chromatographed over alumina. From the pentane fractions, the 3β-acetoxy-18:20-oxido-5α-pregnane of melting point 137–138° can be obtained by recrystallization from pentane or aqueous methanol.

*Example 9*

2.01 g. of Δ⁵-3-ethylenedioxy-11α-acetoxy-20-methyl-20-hydroxy-pregnene are dissolved in 100 cc. of absolute benzene and refluxed for 15 hours after the addition of 4 g. of freshly dried lead-(IV)-acetate, and then worked up. On chromatography over alumina of activity II there are obtained in addition to other products 627 mg. of Δ⁵-3-ethylenedioxy-11α-acetoxy-18:20-oxido-20-methyl-pregnene.

When 150 mg. of this compound are treated with 20 mg. of para-toluenesulfonic acid in 20 ml. of acetone at room temperature overnight, the Δ⁴-3-oxo-11α-acetoxy-20-methyl-18:20-oxido-pregnene is obtained.

The Δ⁵-3-ethylenedioxy-11α-acetoxy-20-methyl-20-hydroxy-pregnene used as starting material is prepared in this manner: 1.500 g. of Δ⁵-3-ethylenedioxy-11α-acetoxy-20-keto-pregnene, dissolved in 50 cc. of absolute ether are added dropwise, though rapidly, while cooling externally to 40 cc. of a 0.22 molar solution of methylmagnesium iodide in absolute ether, the vessel rinsed with another 50 cc. of ether, and the whole refluxed for 1 hour. The cooled reaction mixture is carefully treated with ice-cold ammonium chloride solution, diluted with 300 cc. of ether, and worked up. The neutral, dried ethereal solution yields on evaporation a solid residue which is dissolved in a mixture of 10 cc. of pyridine and 10 cc. of acetic anhydride, and the mixture allowed to stand at room temperature overnight. Working up and recrystallization give 1.250 g. of Δ⁵-3-ethylenedioxy-11α-acetoxy-20-methyl-20-hydroxy-pregnene. The IR spectrum of the compound shows absorption bands at 2.78μ (tertiary hydroxyl) and 5.77μ (11-acetate).

*Example 10*

2 g. of 3β-acetoxy-20β-hydroxy-5α-pregnane, 1 g. of dry calcium carbonate and 6 g. of lead tetracetate are covered with 100 cc. of dry methylcyclohexane. The suspension is stirred while being refluxed for 4½ hours, cooled, and filtered. The residue is washed several times with ethyl acetate. The combined filtrates are washed in succession with potassium iodide solution, sodium sulfite solution, and water, then dried and evaporated under reduced pressure. The resulting residue (2.2 g.) is then chromatographed over 60 g. of alumina of activity II. From the evaporated pentane-, pentane-benzene-9:1- and 8:2-fractions, the 3β-acetoxy-18:20β-oxido-5α-pregnane is easy to obtain. It crystallized, e.g. from methanol alone, or from a mixture of methanol and water. In this manner, 810 mg. of 3β-acetoxy-18:20β-oxido-5α-pregnane are obtained which crystallize in the form of needles and melt at 139–142°.

From the further pentane-benzene-1:1 and benzene fractions (510 mg.) there can be obtained by recrystallization from methanol, 3β-acetoxy-5α-pregnane-20-one of melting point 140–144°. The ether fractions (350 mg.) finally obtained consist mainly of unchanged starting material.

Example 11

2 g. of 3β-acetoxy-20β-hydroxy-5α-pregnane, 1 g. of dry calcium carbonate and 6 g. of lead tetracetate are covered with 100 cc. of dry cyclohexane. The suspension is stirred while being refluxed for 24 hours and then worked up in a manner similar to that of Example 10. From the resulting 2.3 g. of reaction mixture, 960 mg. of starting material can be recovered by recrystallization from hexane. On subsequent chromatography of the mother liquors on 30 g. of alumina of activity II, there can be obtained by recrystallizing from methanol the evaporated pentane-, pentane-benzene-9:1- and 8:2-fractions, 210 mg. of 3β-acetoxy-18:20β-oxido-5α-pregnane. From the further benzene and ether eluates there are finally obtained 540 mg. of unchanged starting material.

Example 12

2 g. of 3β-acetoxy-20β-hydroxy-5α-pregnane, 1 g. of dry calcium carbonate, 6 g. of lead tetracetate and 10 mg. of benzoyl peroxide are covered with 100 cc. of dry cyclohexane. The suspension is stirred while being refluxed for 5 hours, and then worked up as shown in Example 10. The resulting 2.25 g. of reaction mixture are chromatographed over 60 g. of alumina of activity II. The pentane-, pentane-benzene-9:1- and 8:2-fractions are recrystallized from methanol and yield 260 mg. of 3β-acetoxy-18:20β-oxido-5α-pregnane. The further pentane-benzene-7:3- and 1:1-fractions, on being recrystallized from methanol, yield some 3β-acetoxy-5α-pregnane-20-one. The benzene and ether eluates contain 1.3 g. of unchanged starting material.

Example 13

1.25 g. of 3α:11α-diacetoxy-20β-hydroxy-5β-pregnane, 1 g. of dry calcium carbonate and 4 g. of lead tetracetate are covered with 100 cc. of dry methyl cyclohexane. The suspension is stirred while being refluxed for 3 hours, then cooled, and worked up as described in Example 10. The resulting reaction mixture (1.44 g.) is chromatographed over 50 g. of alumina of activity II. From the pentane-benzene-7:3 fraction up to the benzene-8:2 fraction there can be obtained by recrystallization from a mixture of ether and pentane 610 mg. of pure 3α:11α-diacetoxy-18:20β-oxido-5β-pregnane in the form of needles melting at 160–164°. The IR spectrum (methylene chloride) shows bands, inter alia at 5.76μ (strong), 7.26μ, 7.33μ, 8.10μ and 9.75μ. Chromatography of the mother liquors yields further quantities of the 18:20β-oxido compound.

The 3α-11α-diacetoxy-20β-hydroxy-5β-pregnane used as starting material can be prepared by catalytic hydrogenation (platinum-glacial acetic acid) of 3α:11α-diacetoxy-20-oxo-5β-pregnane.

Example 14

5.0 g. of dry, powdered calcium carbonate are added to 30.0 g. of lead tetracetate containing 10% of glacial acetic acid and the whole is refluxed in 450 cc. of methylcyclohexane for 10 minutes at a bath temperature of 120°. 10.0 g. of 3α:11α-diacetoxy-20β-hydroxy-5β-pregnane are then added and the whole is boiled for another 24 hours. After that time, lead tetracetate can no longer be detected. The insoluble inorganic salts are filtered off, the residue is rinsed with ethyl acetate, and the filtrate washed with 5% potassium iodide solution and 10% sodium sulfite solution. The organic solution is dried and evaporated and about 11.5 g. of an oil obtained which crystallized on standing. It is a mixture which consists mainly of the 3α:11α-diacetoxy-18:20β-oxido-5β-pregnane and the 3α:11α:20β-triacetoxy-5β-pregnane and contains almost no starting material.

When for the preparation of the starting material used in this example there is used in the hydrogenation with platinum in glacial acetic acid a well purified 3α:11α-diacetoxy-20-oxo-5β-pregnane, there is obtained on separation of the catalyst and evaporation in a water-jet vacuum a crude product from which the pure 3α:11α-diacetoxy-20β-hydroxy-5β-pregnane can easily be obtained by crystallization from a mixture of ether and pentane. The product melts at 155–156°; $[\alpha]_D^{27} = -5.2°$ (c.=0.968 in chloroform).

Example 15

1.25 g. of powdered, anhydrous calcium carbonate and 3.5 g. of lead tetracetate (containing 10% glacial acetic acid) are suspended in 250 ml. of methylcyclohexane. The mixture is heated to the boil and 2.37 g. of 3β:11α-dihexahydrobenzoyloxy - 20β - hydroxy - 5β pregnane are added, and the whole is refluxed at a bath temperature of 120° under moisture seal. After 24 hours another 5.0 g. of lead tetracetate (containing 10% of glacial acetic acid) are added, and boiling is continued for another 48 hours. After cooling, the insoluble salts are separated by filtration, the filtrate washed with potassium-iodide-sodium sulfite solution and with water, the aqueous solutions are extracted with ethyl acetate, and the combined, dried, organic solutions are evaporated to dryness in a water-jet vacuum. There are obtained 3.57 g. of a colorless, crystalline residue. The crude product is purified by chromatography over 120 g. of alumina of activity II. The elution of a weakly polar compound with a 1:4 mixture of benzene and hexane is followed by the elution, with the same mixture and with a 1:1-mixture of benzene and hexane, of a further by-product which, when recrystallized from methanol, crystallized at 186–196°. The product is believed to be the 3α:11α-di-hexahydrobenzoyloxy-20-acetoxy-5β-pregnane. After that, a total of 1.07 g. of the 3α:11α-di-hexahydrobenzoyloxy-18:20-oxido-5β-pregnane are eluted with a 1:1-mixture of benzene and hexane. After being recrystallized from methanol, the product melts at 186–187°; $[\alpha]_D = +18°$ in chloroform. IR spectrum: bands, inter alia, at 5.30μ; 8.56μ; 8.65μ.

The dihexahydrobenzoate used as starting material in this example is prepared as follows:

5.0 g. of 3α:11α-dihydroxy-5β-pregnane-20-one are dissolved in 100 ml. of absolute pyridine. The solution is cooled to +5°, treated with 4.32 g. of hexahydrobenzyl chloride, stirred overnight at room temperature, and poured into a mixture of 70 ml. of ice-cold water and 35 ml. of 2N-hydrochloric acid. After another 30 minutes, the reaction mass is filtered with suction and the filter residue crystallized from methylene chloride+methanol. There are obtained 6.93 g. of the 3α:11α-di-hexahydrobenzoyloxy-5β-pregnane - 20 - one of melting point 155–156°; $[\alpha]_D = +76°$ in chloroform. IR spectrum: bands, inter alia, at 5.80μ, 8.55μ, and 8.84μ.

3.0 g. of this compound are dissolved in 300 ml. of glacial acetic acid and, after the addition of 300 mg. of platinum oxide, stirred under an atmosphere of hydrogen until the absorption of gas ceases. The catalyst is then filtered off, the filtrate evaporated to dryness in vacuo, and the residue filtered through 200 g. of alumina of activity II. The 3α:11α-di-hexahydrobenzoyloxy-20β-hydroxy-5β-pregnane is eluted with benzene. On crystallization from methanol there is obtained a total of 2.72 g. of the substance which melts at 174–176°.

Example 16

450 mg. of 3α:11α-dipivalyloxy-20β-hydroxy-5β-pregnane are boiled with 1.35 g. of lead tetracetate (containing 10% glacial acetic acid) and 250 mg. of calcium carbonate in 45 ml. of methylcyclohexane for 20 hours at a bath temperature of 120° with stirring and exclusion of moisture. The insoluble organic salts are then filtered off with suction, the reaction vessel and the filter residue are rinsed with ethyl acetate, and the filtrate washed with potassium iodide solution and sodium sulfite solution. The organic solution is dried and evaporated. Only traces of starting material can be detected in the chromatoplate with silicagel and the solvent system benzene-ethyl acetate-8:2. The crude product consists mainly of a mixture of the weakly polar 3α:11α-dipivalyloxy-18:20β-oxido-5β-pregnane and the somewhat more strongly polar 3α:11α-dipivalyloxy-20β-acetoxy-5β-pregnane.

The latter compound, after being purified and recrystallized from methylene chloride+methanol, melts at 178–180°. By mild hydrolysis with 1.3 molecular equivalents of potassium carbonate in methanol it can be reconverted into the 3α:11α-dipivalyloxy-20β-hydroxy-5β-pregnane.

The dipivalate used as starting material in this example is prepared as follows: 3.73 g. of 3α:11α-dihydroxy-5β-pregnane-20-one are dissolved in 25 ml. of pyridine and treated at about −5° with 8 ml. of pivalyl chloride. The mixture is allowed to stand, first for 1 hour at 0°, then overnight at room temperature, after which ice is added while cooling externally with a mixture of ice and sodium chloride. The temperature is then allowed to rise to room temperature while the reaction mass is being stirred. The mixture is then diluted with ether and the solution washed with dilute sodium carbonate solution, dilute hydrochloric acid, and water. The ethereal solution is dried and the residue chromatographed over 120 g. of alumina of activity I. The 3α:11α-dipivalyloxy-5β-pregnane-20-one is eluted with 9:1-, 4:1-, 7:3-, and 1:1 mixtures of petroleum ether and benzene (about 1.8 g.). After being recrystallized from ether+pentane, the compound melts at 130.5–133°; $[\alpha]_D^{24.5} = +67°$ (c.=1.16 in chloroform). The IR spectrum shows a band at 5.79μ (with inflection at 5.82μ) and more bands at 7.34μ, 8.10μ, 8.59μ and 9.79μ.

500 mg. of this dipivalate are hydrogenated in 30 ml. of glacial acetic acid with 50 mg. of platinum oxide until the uptake of hydrogen ceases. The catalyst is removed and the filtrate evaporated to dryness in a water-jet vacuum. The crude 3α,11α-di-pivalyloxy-20β-hydroxy-5β-pregnane so obtained is subjected to oxidation with lead tetracetate.

*Example 17*

A suspension of 5 g. of calcium carbonate and 25 g. of lead-(IV)-acetate in 300 ml. of absolute methyl cyclohexane is continuously stirred while being refluxed until the initial yellowish-brown coloration has disappeared completely, which requires about 20 minutes. At the boiling temperature, a suspension of 5 g. of 3α:11β-diacetoxy-20β-hydroxy-5β-pregnane in 20 ml. of methyl cyclohexane is then added in one portion and the mixture refluxed with stirring for 7 hours. After cooling, the insoluble portions are filtered off with suction, the solid residue washed first with ether and then with water, and the combined washings combined with the filtrate. The organic phase is diluted with ether and washed in succession with water, potassium iodide solution and thiosulfate solution. On evaporation of the solvent 5.4 g. of a crude product are obtained which are dissolved in a 4:1 mixture of petroleum ether and benzene and filtered through 20 times its quantity of alumina of activity II. For hydrolysis of the acetate residues, the resulting eluate—2.55 g. of the amorphous 3α:11β-diacetoxy-18:20β-oxido-5β-pregnane—is dissolved in 50 cc. of absolute dioxane and heated with 2.5 g. of lithium aluminum hydride for one hour under reflux. The usual working up yields 2.1 g. of the crystalline 3α:11β-dihydroxy-18:20β-oxido-5β-pregnane, which, after one recrystallization from dilute methanol, has a constant melting point of 223–224° (830 mg.). $[\alpha]_D = +41°$ in methanol+chloroform. IR: Broad bands at 2.94–3.03μ in Nujol.

50 mg. of the diol ether are allowed to stand overnight at room temperature with 1 ml. of acetic anhydride and 1 ml. of pyridine. For purification, the crude product obtained in the usual manner is dissolved in benzene and the solution filtered through a column of 1 g. of alumina of activity II. From dilute methanol there are obtained crystals of 3α-acetoxy-11β-hydroxy-18:20β-oxido-5β-pregnane melting at 153–154°; $[\alpha]_D = +65°$. IR bands at 2.90μ and 5.76μ in Nujol.

A solution of 300 mg. of 3α:11β-dihydroxy-18:20β-oxido-5β-pregnane in 30 ml. of acetone is oxidated at 0° while being stirred for 30 minutes with 3 ml. of a Kiliani mixture. After the addition of methanol, the reaction mixture is worked up in the usual manner. The resulting 3:11-diketo-18:20β-oxido-5βpregnane (300 mg.) crystallizes from dilute methanol and after three recrystallizations shows the constant melting point of 164–165°. $[\alpha]_D = +54°$. IR band at 5.85μ in chloroform.

The Δ⁴-3:11-diketo-18:20β-oxido-pregnene, prepared in the usual manner by brominating the saturated diketone in glacial acetic acid with the addition of hydrogen bromide, splitting off hydrogen bromide by means of lithium bromide and lithium carbonate in dimethyl formamide, melts at 166–167° after being recrystallized from a mixture of acetone and heptane. $[\alpha]_D = +203°$ (in chloroform); UV spectrum: Maximum at 238 mμ (log ε=4.18).

The 3α:11β-diacetoxy-20β-hydroxy-5β-pregnene used as starting material can be prepared as follows:

5 g. of 3α:11β-dihydroxy-20-keto-5β-pregnane, dissolved in 50 ml. of glacial acetic acid are allowed to stand at room temperature overnight with 10 ml. of acetic anhydride and 0.5 g. of para-toluene sulfonic acid. The mixture is then poured into water and extracted with ether. The ethereal extracts are washed neutral with ether and evaporated to obtain 5.1 g. of crystals which are filtered through a column of 10 g. of alumina of activity II. There are obtained in this manner, after recrystallization from dilute methanol, 4.7 g. of 3α:11β-diacetoxy-20-keto-5β-pregnane of melting point 123–124°. $[\alpha]_D = +133°$. IR bands at 5.80μ and 5.88μ (shoulder) in chloroform.

10 g. of the above 20-keto compound are dissolved in 200 ml. of glacial acetic acid and hydrogenated in the presence of 1 g. of pre-hydrogenated platinum dioxide catalyst. When 1 mol of hydrogen has been taken up, the reduction comes to a standstill. The solution is freed from the catalyst and the solvent sucked off under a water-jet vacuum. A crude product is obtained which from methylene chloride+heptane gives 9.5 g. of 3α:11β-diacetoxy-20β-hydroxy-5β-pregnane in the form of needles of melting point 132–133°. $[\alpha]_D = +56°$. IR bands at 2.76μ and 5.80μ in $CHCl_3$.

*Example 18*

5 g. of lead tetracetate (dried under a high vacuum at 20°), 0.5 g. of calcium carbonate (dried over $P_2O_5$) and 50 mg. of benzoyl peroxide are refluxed in 150 cc. of cyclohexane for 10 minutes with stirring, then cooled and treated with 1 g. of Δ⁵-3-ethylenedioxy-11α-acetoxy-20β-hydroxypregnene, then refluxed for another 24 hours with stirring. The insoluble salts are then filtered off, the residue washed with ethyl acetate, the filtrate washed with potassium iodide solution, sodium sulfite solution, and water, dried and evaporated under reduced pressure. The residue (1.28 g.) is chromatographed over 30 g. of alumina of activity II.

The fractions eluted with 1:1- and 1:2-pentane-benzene mixtures yield on crystallization from ether-pentane mixtures 393 mg. of Δ⁵-3-ethylenedioxy-11α-acetoxy-18:20-oxido-pregnene of melting point 170–174°. IR-spectrum: No hydroxyl bands. Bands at 5.76μ (acetate), 8.10μ (acetate), 9.20μ, (Δ⁵-3-ketal) and 9.76μ (acetate).

200 mg. of this compound are dissolved in 5.0 ml. of acetone and, after the addition of 20 mg. of para-toluene-sulfonic acid, allowed to stand at room temperature overnight. The solution is then evaporated under a water-jet vacuum, the residue is taken up in ether, washed with dilute potassium bicarbonate solution and water, and the dried ethereal extracts are evaporated. There are obtained 170 mg. of crude Δ⁴-3-keto-11α-acetoxy-18:20-oxido-pregnene which, after recrystallization from petroleum ether, melts at 122–128°.

The Δ⁵-3-ethylenedioxy-11α - acetoxy - 20β - hydroxy-pregnene used as starting material can be obtained as follows:

20 g. of 11α-acetoxy-progesterone are dissolved in 750 ml. of methanol, treated with 4 g. of sodium borohydride, and allowed to stand at room temperature for 3 hours. After the addition of 10 ml. of glacial acetic acid, the reaction mixture is evaporated in vacuo, the residue taken up in ether and water, and washed with sodium bicarbonate solution and water. From the ethereal solution 20.15 g. of $\Delta^4$-3β:20β-dihydroxy-11α-acetoxy-pregnene are obtained in the form of a colorless foam. Without being purified, the product so obtained is dissolved in 130 ml. of absolute benzene and 215 ml. of pyridine, cooled to —20°, and treated with 9.2 g. of N-bromacetamide. The solution is stirred at the same temperature for about 15 minutes, i.e. until all bromacetamide is dissolved, and the solution, which assumes a yellowish color, then allowed to stand at —10° for 2 hours. For working up, the reaction solution is diluted with 1.5 liters of ether and then washed in succession with a 10% sodium bisultite solution, water, dilute hydrochloric acid, water, bicarbonate solution, and water. The solution is dried and evaporated in vacuo to yield 19.52 g. of the amorphous $\Delta^4$-3-keto-11α-acetoxy-20β-hydroxy-pregnene. The crude product can be purified by chromatography over alumina.

A solution of 21.25 g. of this crude $\Delta^4$-3-ketone in 2 liters of absolute benzene is treated with 300 ml. of ethylene glycol and 1.2 g. of para-toluene-sulfonic acid is boiled over night with stirring and with the use of a water separator. The cooled reaction mixture is taken up in ether and ice water, and the organic layer washed once with 500 ml. of saturated sodium bicarbonate solution and five times with 2 liters of water each time. My recrystallizing the residue of the ethereal extracts from methylene chloride-methanol, 12.13 g. of $\Delta^5$-3-ethylenedioxy-11α-acetoxy-20β-hydroxy-pregnene of melting point 214–217° are obtained.

*Example 19*

281 mg. of crude 3α:11α-diacetoxy-18:20β-oxido-5β-pregnane, dissolved in 27 ml. of methanol are treated with 48 mg. of potassium carbonate in 3 ml. of water and allowed to stand at room temperature for 16 hours. By careful evaporation of the reaction mixture at 40° in vacuum to about 10 ml. dilution with about 50 ml. of water, extraction of the solution with ether, washing the ethereal extract with saturated sodium chloride solution, drying, and evaporating the solvent under reduced pressure, 258 mg. of a crystalline compound are obtained. Two recrystallizations from a mixture of ether and hexane yield 183 mg. of pure 3α-hydroxy-11α-acetoxy-18:20β-oxido-5β-pregnane of melting point 152–154°. The IR spectrum of the compound shows bands at 2.74, 5.85, 8.10 and 9.75μ.

For oxidation of the 3α-hydroxy group of the aforedescribed 3α-hydroxy-11α-acetoxy-18:20β - oxido - 5β-pregnane, 100 mg. of the compound are dissolved in 6 ml. of glacial acetic acid and treated dropwise, with stirring, with 1.8 ml. of a 1% solution of chromium-(VI)-oxide in 90% acetic acid. After 14 hours at 20°, 2 ml. of methanol are added and another hour later the reaction mixture is evaporated to a great extent at room temperature under reduced pressure. The residue is taken up in ether, washed with water, saturated sodium bicarbonate solution and water, dried and evaporated. The resulting product (98 mg.) crystallizes, but is preferably purified by dissolving it in 10 ml. of a 9:1 hexane-benzene mixture and filtering it through 2 g. of neutral alumina of activity II. The fractions eluted with hexane-benzene mixtures (91 mg.) have a melting point of 151–153° and are purified by recrystallization from a mixture of ether and hexane. In this manner there are obtained 85 mg. of 3-keto-11α-acetoxy-18:20β-oxido-5β-pregnane of melting point 155–156°. The product shows the following IR absorption bands: 5.82, 5.87, 8.07, 9.75, 10.35μ.

*Example 20*

150 mg. of 3α:11α-diacetoxy-18:20β-oxido-5β-pregnane are dissolved in 6 ml. of methanol and treated with a solution of 150 mg. of potassium hydroxide in 1 ml. of water, and the resulting mixture boiled for half an hour on the water bath. After another hour and a half at 20°, the reaction solution is diluted with 20 ml. of water, saturated with sodium chloride and extracted with a mixture of 4 parts of ether and 1 part of ethylene chloride. The organic layer is washed with saturated sodium chloride solution and dried and yields on evaporation 128 mg. of a sparingly soluble crystalline product. After one recrystallization from a mixture of acetone and hexane 72 mg. of 3α:11α-dihydroxy-18:20β-oxido-5β-pregnane of melting point 212–215° are obtained. This product can be used for the following reactions without being purified.

69 mg. of the above-described 3α:11α-dihydroxy-18:20β-oxido-5β-pregnane are dissolved, with the application of heat, in a mixture of 8 ml. of acetone, 2 ml. of methanol, and 2 ml. of water. The solution is cooled to 5° and admixed with 75 mg. of N-bromacetamide and then allowed to stand in the dark at 5° for 3½ hours. For working up, the reaction mixture is poured into 10 ml. of 5% sodium sulfate solution and extracted with ether. The ethereal solution is washed neutral and dried. On evaporation in vacuo it leaves a crystalline residue (51 mg.) which on recrystallization once from a mixture of methylene chloride, ether and hexane, yields 45 mg. of 3-keto-11α-hydroxy-18:20β-oxido-5β-pregnane of melting point 183–185°. The mixed melting point of the compound shows a depression of about 80° as compared with the starting material.

41 mg. of 3-keto-11α-hydroxy-18:20β-oxido-5β-pregnane, dissolved in 0.5 ml. of acetic anhydride and 0.5 ml. of pyridine are allowed to stand at 20° for 15 hours, the solution then treated with 5 ml. of methanol while cooling, half an hour later evaporated in vacuo, and the residue taken up in a mixture of ether and water. The ethereal solution is washed neutral, dried and evaporated and the residue recrystallized from a mixture of methylene chloride and hexane to obtain 3-keto-11α-acetoxy-18:20β-oxido-5β-pregane of melting point 155–156°.

*Example 21*

100 mg. of 3-keto-11α-acetoxy-18:20β-oxido-5β-pregnane are dissolved in 4 ml. of glacial acetic acid and after the addition of 1 drop (about 0.01 ml.) of HBr in glacial acetic acid treated dropwise, while stirring, with 1.195 ml. of an 0.4525-N solution of bromine in glacial acetic acid. Working up with ether yields 122 mg. of a non-crystallizing bromide. The latter is dissolved as it is in 5 ml. of a 10% lithium chloride solution in dimethyl formamide and the whole heated to 100° for 3 hours. The reaction mixture is treated with water, and extracted with ether. The crude product so obtained (103 mg.) has a slight content of halogen. For purification it is dissolved in 10 ml. of a 4:1 mixture of hexane and benzene and chromatographed over neutral alumina of activity II. Apart from an unidentified, halogen-containing compound having an unsharp melting point of 133–135° there are obtained 31 mg. of the $\Delta^4$-3-keto-11α-acetoxy-18:20β-oxido-5β-pregnane which melts at 117.5–119°. The analytically pure compound melts at 124.5–125.5°. In the IR spectrum it has the following bands: 5.82, 6.04, 6.25, 8.1, 9.15, 9.75, 10.25 and 10.62μ.

*Example 22*

5.0 g. of lead tetracetate and 1.0 g. of dry calcium carbonate are suspended in 200 ml. of methyl cyclohexane and the mixture heated to the boil. Then 1.0 g. of 3α-acetoxy-11-oxo-20β-hydroxy-5β-pregnane is added and the whole refluxed overnight. After cooling, the insoluble salts are filtered off, the filtrate washed with potassium iodide solution and sodium sulfite solution, extracted with ethyl acetate, and the extracts dried and evaporated in a water-jet vacuum. The crude product (1.27 g.) is purified by chromatography over 30 g. of alumina of activity II. The fractions eluted with 1:9-, 3:7-, 1:1-, 2:1-mixtures of benzene and petroleum ether yield on crystallization from petroleum ether 340 mg. of 3α-acetoxy-11-oxo-18:20-oxido-5β-pregnane of melting point 153–162°. IR spectrum in methylene chloride: bands inter alia at 5.81μ, 5.89μ, 8.10μ, 9.28μ, 9.43μ, and 9.73μ.

On hydrolysis with sodium carbonate in methanol and subsequent oxidation with pyridine+chromic acid there is obtained the 3:11-dioxo-18:20-oxido-5β-pregnane described in Example 17.

The 3α-acetoxy-11-keto-20β-hydroxy-5β-pregnane used as starting material is prepared from the known 3α-acetoxy-11:20-diketo-5β-pregnane by hydrogenation in tetrahydrofuran with the use of a platinum catalyst. After recrystallization from methanol it melts at 194–204°.

Example 23

A suspension of 5.0 g. of lead tetracetate (dried in a high vacuum) and 1.0 g. of dry calcium carbonate in 200 ml. of methylcyclohexane is heated to the boil and after 10 minutes treated with 1.0 g. of Δ⁵-3β:21-diacetoxy-20-hydroxy-pregnene. The reaction mass is then refluxed for 16 hours with the exclusion of moisture, cooled, the insoluble salts separated by filtration, and the filtrate washed with potassium iodide solution and sodium sulfite solution. The filter residue and the aqueous solutions are extracted with ethyl acetate. From the dried organic solutions there are obtained on evaporation 1.39 g. of crude product which is purified by chromatography over alumina of activity II. With pentane and a 9:1-mixture of pentane and benzene oily products are eluted. From the fractions eluted with 7:3-, 1:1- and 1:2-mixture of pentane and benzene there are obtained by crystallization from petroleum ether 310 mg. of the Δ⁵-3β:21-diacetoxy-18:20-oxido-pregnene of melting point 158–164°. IR spectrum in methylene chloride: Bands inter alia at 5.81μ, 8.10μ and 9.66μ.

Example 24

200 mg. of 3α:11α-diacetoxy-20β-hydroxy-5β-pregnane are dissolved in 25 ml. of benzene and, after the addition of 1.0 g. of lead tetrabenzoate, refluxed for 24 hours. The cooled solution is filtered through Celite (registered trademark) and diluted with ethyl acetate and ether, and washed with 50 ml. of 5% potassium iodide solution, 50 ml. of 10% sodium sulfite solution, twice with 50 ml. of saturated sodium bicarbonate solution each time, and finally twice with 50 ml. of water, then dried and evaporated. The partially crystallizing residue weighs 405 mg. According to chromatographic analysis it contains about 40% 3α:11α-diacetoxy-18:20-oxido-5β-pregnane.

Example 25

Lead tetratrifluoracetate, prepared by dissolving 5 g. of lead tetracetate in 20 ml. of trifluoracetic acid and evaporation in vacuo, this operation being repeated three times, is added to a solution of 1.0 g. of 3α:11α-diacetoxy-20β-hydroxy-5β-pregnane in 120 ml. of absolute benzene, and the whole refluxed for 12 hours. The cooled solution is filtered, diluted with ether, and washed with 5% potassium iodide solution, 10% sodium sulfite solution, saturated sodium bicarbonate solution, and water, dried and evaporated to obtain 1.20 g. of an oily residue. According to chromatographic analysis more than 50% of the latter consist of unchanged starting material, and 20–30% of it of 3α:11α-diacetoxy-18:20-oxido-5β-pregnane. By chromatography over alumina, the latter can be separated from the starting material.

The lead-tetratrifluoracetate can also be obtained by reacting lead tetracetate in benzene with silver trifluoracetate, evaporation, filtering off the precipitated silver acetate, and evaporation to dryness.

Example 26

750 mg. of calcium carbonate and 3.81 g. of lead tetracetate (containing 10% glacial acetic acid) are stirred while being heated to 100° for ¼ hour in 120 ml. of methyl cyclohexane. After the addition of 1.274 g. of 3α:11α-dibenzoyloxy-20β-hydroxy-5β-pregnane the whole is refluxed for 24 hours with stirring. Another 2.70 g. of lead tetracetate are added and the reaction mixture stirred and refluxed for another 38 hours. The cooled solution is filtered, diluted with ethyl acetate and ether, washed with 300 ml. of 5% potassium iodide solution, 300 ml. of 10% sodium sulfate solution, and 300 ml. of water, then dried and evaporated. The semi-crystalline residue weighing 1.82 g. is chromatographed over neutral alumina of activity II. In addition to 80 mg. of a weakly polar compound melting at 140–143° and 280 mg. of a product obtained after two recrystallizations from methylene chloride+petroleum ether in the form of fine needles of melting point 229–230°, there are obtained 820 mg. of the 18:20-ether which, however, is contaminated with a slightly polar substance. Two recrystallizations or renewed chromatography yield the pure 3α:11α-dibenzoyloxy-18:20-oxido-5β-pregnene of melting point 216–219° C.

The same compound can also be obtained from the 3α:11α-dihydroxy-18:20-oxido-5β-pregnane described in Example 20 by benzoylation with benzoyl chloride in pyridine.

The 3α:11α-dibenzoyloxy-20β-hydroxy-5β-pregnane used as starting material is prepared as follows: 5.0 g. of 3α:11α-dihydroxy-5β-pregnane-20-one are dissolved in 100 ml. of absolute pyridine. The solution is cooled to 0° and treated with 4.32 ml. of benzoyl chloride and allowed to stand at room temperature overnight. A mixture of 35 ml. of 2 N-hydrochloric acid and 70 ml. of ice-cold water is then added, the whole stirred for 1 hour at room temperature, then poured into 1000 ml. of water, the white precipitate is filtered off with suction, and is washed well with water. The filter residue yields on crystallization from methylene chloride+ether 5.86 g. of 3α:11α-dibenzoyloxy-5β-pregnane-20-one of melting point 214–219°.

2.7 g. of the 3α:11α-dibenzoyloxy-20-keto-5β-pregnane are suspended in 750 ml. of methanol, treated with 1.30 g. of sodium borohydride, and stirred for 2 hours at room temperature. After 30 minutes already, the whole of the ketone dissolves and the reaction product begins to precipitate slowly. The reaction mixture is then neutralized with the calculated quantity of glacial acetic acid and treated with water until all of the reaction product has precipitated. The precipitate is filtered, washed with water, taken up in ether, the ethereal solution washed neutral with water, dried and evaporated. The product so obtained is a mixture of the two C–20 isomeric alcohols and is preferably separated by chromatography over neutral alumina of activity II. In this manner, there are isolated 2.10 g. of 3α:11α-dibenzoyloxy-20β-hydroxy-5β-pregnane of melting point 208–209°, $[\alpha]_D = +49.0°$, and 485 mg. of 3α:11α-dibenzoyloxy-20α-hydroxy-5β-pregnane of melting point 211–213° $[\alpha]_D = +51.6°$. The IR spectrum shows the expected absorption bands at 2.75, 5.85, 6.25, 7.9, and 8.95μ.

By the usual methods, the 20β-hydroxy compound yields an acetate which after recrystallization from a mixture of methylene chloride and petroleum ether melts at 272–274°.

The corresponding 20α-acetoxy compound crystallizes from a mixture of methylene chloride and petroleum ether in the form of fine tufts melting at 216–220°.

Example 27

To a stirred suspension of 200 mg. of calcium carbonate and 600 mg. of lead tetracetate in 25 ml. of benzene are added at 80° 200 mg. of 3α:11α-benzoyloxy-20α-hydroxy-5β-pregnane, and the whole refluxed for 16 hours. The usual working up yields 240 mg. of a non-crystallizing oil which according to chromatographic analysis contains the 3α:11α - dibenzoyloxy - 18,20α - oxido-5β-pregnane in addition to unchanged starting material.

*Example 28*

2 g. of calcium carbonate and 6 g. of lead tetracetate are suspended in 200 ml. of methyl cyclohexane and heated with stirring at 100° for 14 hours. After the addition of 1.85 g. of Δ⁵-3-ethylenedioxy-11α-acetoxy-20β-hydroxy-pregnene the reaction mixture is refluxed for 15 hours. After that, another 4.0 g. of lead tetracetate are added and boiling continued for another 24 hours with stirring. Working up is performed as described in Example 23. There are isolated 2.9 g. of an oil which has an aromatic odor and crystallizes after a rather long time. It is separated into its constituents by chromatography over alumina of activity II. Apart from 105 mg. of a compound melting at 159–161° there are obtained 950 mg. of Δ⁵-3-ethylenedioxy-11α-acetoxy-18:20-oxido-pregnene. By one recrystallization there are isolated 735 mg. of a pure preparation melting at 167–169°. From the mother liquor, 115 mg. of a somewhat less pure product can be obtained.

500 mg. of potassium hydroxide, dissolved in 6 ml. of water are added to a solution of 730 mg. of Δ⁵-3-ethylenedioxy - 11α - acetoxy - 18:20-oxido-pregnene in 20 ml. of methanol, and the resulting clear and homogeneous solution is boiled for 1½ hours under reflux. The slightly yellow solution is diluted with 10 ml. of water and allowed to cool. The saponification product crystallizes in the form of fine needles; it is filtered off, dried and recrystallized from a mixture of methanol and water. There are obtained 515 mg. of Δ⁵-3-ethylenedioxy-11α-hydroxy-18:20-oxido-pregnene of melting point 197–199°. From the mother liquor, another 45 mg. of the same compound are obtained.

450 mg. of chromium-VI-oxide, dissolved in 95 ml. of water and 15 ml. of pyridine, are added to a solution of 450 mg. of Δ⁵-3-ethylenedioxy-11α-hydroxy-18:20-oxido-pregnene and the whole allowed to stand overnight. The dark brown reaction mixture is treated with 10 ml. of methyl alcohol and 350 ml. of water, allowed to stand for a short while and then filtered to separate the precipitate, which is washed thoroughly with water and dried, and finally extracted three times with warm methylene chloride. In this manner, 217 mg. of a slightly colored product are obtained. By one recrystallization from methylene chloride+methanol there are isolated 277 mg. of Δ⁵ - 3 - ethylenedioxy-11-keto-18:20-oxido-pregnene of melting point 205–208. The IR spectrum of the compound shows the band at 5.90μ which is typical of the carbonyl group.

247 mg. of Δ⁵-3-ethylenedioxy-11-keto-18:20-oxido-pregnene are dissolved in 10 ml. of acetone, treated with 30 mg. of para-toluenesulfonic acid and allowed to stand at room temperature for 17 hours. The mixture is then diluted with water, the crystalline precipitate filtered off, the filtrate saturated with sodium chloride and worked up with ether in the usual manner. The resulting product (75 mg.) is combined with the filter residue (131 mg.) and recrystallized from a mixture of methylene chloride, ether and petroleum ether. There are obtained 146 mg. Δ⁴ - 3:11 - diketo - 18:20-oxido-pregnene of melting point 171–173° in addition to 35 mg. of the same compound of melting point 165–168°. The IR spectrum of the compound shows the expected absorption bands of the saturated and unsaturated groupings at 5.88μ, 6.0μ and 6.19μ.

*Example 29*

A solution of 250 mg. of 3β-hydroxy-18:20β-oxido-5α-pregnane in 30 ml. of glacial acetic is treated with a 1% solution of chromium-(IV)-oxide in 90% acetic acid and allowed to stand at room temperature overnight. After the addition of a small amount of methanol, the whole is poured into water and worked up with ether. There are obtained 223 mg. of a crude product which is filtered through a small column of alumina of activity II and then recrystallized from dilute methanol. The resulting pure 3-keto-18:20-oxido-5α-pregnane melts at 150–152°, [α]_D=+25°; IR spectrum: bands at 5.87μ in CHCl₃.

What is claimed is:

1. Δ⁴-3-oxo-11α-hydroxy-18:20 - oxido - 20 - methyl-pregnene.
2. Δ⁵-3-ethylenedioxy-11α-hydroxy-18:20 - oxido - 20-methyl-pregnene.
3. Δ⁵-3:21-dihydroxy-18:20-oxido-pregnene.
4. 18:20β-oxido-3β-hydroxy-5α-pregnane.
5. Δ⁴-18:20β-oxido-3-oxo-11α-hydroxy-pregnene.
6. Δ⁵-18:20β-oxido-3 - ethylenedioxy - 11α - hydroxy-pregnene.
7. 18:20β-oxido-3-oxo-11α-hydroxy-5β-pregnane.
8. 18:20β-oxido-3-oxo-5α-pregnane.
9. An ester of a steroid selected from the group consisting of Δ⁴-3-oxo-11α-hydroxy-18:20-oxido-20-methyl-pregnane and Δ⁵ - 3 - ethylenedioxy - 11α-hydroxy-18:20-oxido-20-methyl-pregnane, said ester being derived from a member selected from the group consisting of lower aliphatic carboxylic acids and monocyclic aromatic carboxylic acids.
10. 18,20β-epoxy-4-pregnene-3,11-dione.
11. A member selected from the group consisting of a compound of the formula

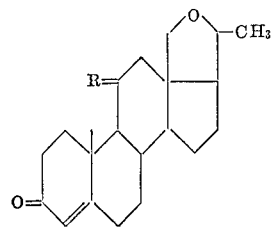

wherein R represents a member selected from the group consisting of

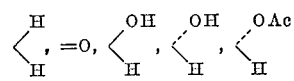

and its lower 3-alkylene ketals, and a compound of the formula

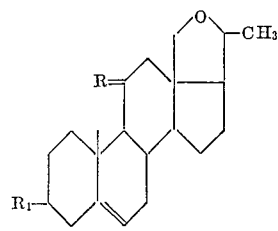

wherein R₁ is a member selected from the group consisting of

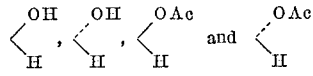

and R has the same meaning as given above, Ac representing any acyl group derived from a member selected from the group consisting of lower aliphatic carboxylic acids and monocyclic aromatic carboxylic acids, a saturated allo-pregnane and an 11-unsubstituted pregnane compound corresponding to any of the compounds of the above formulae, and an 18,20α-oxido-epimer of any of these compounds.

(References on following page)

References Cited by the Examiner

UNITED STATES PATENTS 2,255,264  9/1941  Marker _____ 260—397.4
2,712,027  6/1955  Rosenkranz et al. __ 260—397.4

OTHER REFERENCES

Dorfman et al.: Androgens, John Wiley & Sons, Inc., New York, N.Y. (1956), page 496.

Elsevier Publishing Co., New York, N.Y. (1953), pp. 970–1.

Fieser et al.: Steroids, Reinhold Pub. Corp., New York, N.Y. (1959), pp. 224 and 614.

Rodd: Chemistry of Carbon Compounds, vol. II, part B.

LEWIS GOTTS, *Primary Examiner.*

LESLIE H. GASTON, MORRIS LIEBMAN, *Examiners.*

M. L. WILLIAMS, ELBERT L. ROBERTS,
*Assistant Examiners.*